(12) United States Patent
O'Sullivan et al.

(10) Patent No.: US 8,271,593 B2
(45) Date of Patent: Sep. 18, 2012

(54) SYSTEM AND METHOD FOR CIRCUMVENTING INSTANT MESSAGING DO-NOT-DISTURB

(75) Inventors: Patrick Joseph O'Sullivan, Ballsbridge (IE); Gary Denner, Celbridge (IE); Ruthie D. Lyle, Durham, NC (US); Cynthia Barber-Mingo, Westford, MA (US); Mary Ellen Zurko, Groton, MA (US)

(73) Assignee: International Business Machines Corporation, Armonk, NY (US)

( * ) Notice: Subject to any disclaimer, the term of this patent is extended or adjusted under 35 U.S.C. 154(b) by 619 days.

(21) Appl. No.: 12/057,805

(22) Filed: Mar. 28, 2008

(65) Prior Publication Data

US 2009/0249432 A1 Oct. 1, 2009

(51) Int. Cl.
G06F 15/16 (2006.01)
(52) U.S. Cl. ........................... 709/206; 709/201
(58) Field of Classification Search .................. 709/206
See application file for complete search history.

(56) References Cited

U.S. PATENT DOCUMENTS

| 7,606,862 | B2 * | 10/2009 | Swearingen et al. | 709/206 |
|---|---|---|---|---|
| 2003/0204720 | A1 * | 10/2003 | Schoen et al. | 713/153 |
| 2003/0229670 | A1 | 12/2003 | Beyda | |
| 2004/0223599 | A1 * | 11/2004 | Bear et al. | 379/207.02 |
| 2005/0132011 | A1 | 6/2005 | Muller et al. | |
| 2005/0192039 | A1 * | 9/2005 | Xue et al. | 455/517 |
| 2005/0203916 | A1 | 9/2005 | Hirose | |
| 2005/0223075 | A1 * | 10/2005 | Swearingen et al. | 709/207 |
| 2006/0036688 | A1 | 2/2006 | McMahan et al. | |
| 2006/0190547 | A1 | 8/2006 | Bhogal et al. | |
| 2008/0002820 | A1 | 1/2008 | Shtiegman et al. | |
| 2008/0126481 | A1 | 5/2008 | Chakra et al. | |
| 2010/0115033 | A1 * | 5/2010 | Geffner et al. | 709/206 |
| 2010/0233995 | A1 * | 9/2010 | Gopalaswamy et al. | 455/410 |

OTHER PUBLICATIONS

Avrahami et al., "QnA: Augmenting an Instant Messaging Client to Balance User Responsiveness and Performance," Computer Supported Cooperative Work Conference Proceedings, Carnegie Mellon University, Nov. 2-10, 2004, pp. 515-518.
Cutrell et al., "Notification, Disruption, and Memory: Effects of Messaging Interruptions on Memory and Performance," Human-Computer Interaction, INTERACT '01. IFIP TC.13, International Conference on Human-Computer Interaction, pp. 263-269.
LeeTiernan et al., "Effective Notification Systems Depend on User Trust," Conference: Proceeding of the 8th International Conference on Human Computer Interactions (INTERACT 2001), Tokyo, JP, Jul. 9-13, 2001, pp. 1-2.
http://www.microsoft.com/smallbusiness/resources/technology/communications/10_tips_for_using_instant_messaging_for_business.mspx, AMA/ePolicy Institute Research, pp. 1-19. http://www.zdnetasia.com/news/security/0,39044215,39222828,00.htm, ZDNet Asia News, downloaded Feb. 2, 2012, pp. 1-6.
http://www.carrollcommunications.com/ipoffice/5donotdisturb.html, downloaded Feb. 2, 2012, pp. 1-2.
http://www.scrtc.com/donotdisturbservice;html, downloaded Apr. 27, 2012, pp. 1-2.
OASIS, Assertions and Protocol for the Oasis Security Assertion Markup Language (SAML) V1.1, Oasis Standard Sep. 2, 2003, pp. 1-53.
Mahy et al., "A Call Control and Multi-party Usage Framework for the session Initiation Protocol (SIP)," http://www.ietf.org/internet-drafts/draft-ietf-sipping-cc-framework-05.txt, downloaded Apr. 27, 2012 pp. 1-46.
http://www.ecma-international.org/publications/standards/Ecma-193.htm, downloaded on Feb. 2, 2012, pp. 1-2.

* cited by examiner

*Primary Examiner* — Thu Nguyen
*Assistant Examiner* — Neeraj Utreja
(74) *Attorney, Agent, or Firm* — Holland & Knight LLP; Brian J. Colandreo, Esq.; Michael T. Abramson, Esq.

(57) ABSTRACT

A method and computer program product for defining one or more authorized users capable of granting do-not-disturb circumvention privileges, and receiving an indicator of a grant of do-not-disturb circumvention privileges to a circumventing user by the one or more authorized users. A do-not-disturb status of an instant messaging user is circumvented based upon, at least in part, the grant of do-not-disturb circumvention privileges.

20 Claims, 7 Drawing Sheets

SYSTEM AND METHOD FOR CIRCUMVENTING INSTANT MESSAGING DO-NOT-DISTURB

TECHNICAL FIELD

This disclosure relates to instant messaging and, more particularly, to systems and methods for circumventing a do-not-disturb status in Instant messaging systems.

BACKGROUND

Instant messaging provides real-time text based communication between two or more users interacting via computers or mobile devices. The more immediate and direct interaction provided by instant messaging often tends to more closely resemble a conversation, as compared to the more "letter like" format of email. The direct interaction between users can provide highly effective and convenient collaboration. For example, problems of unanswered emails and unreturned phone messages can be avoided.

While instant messaging can be a very useful tool for communication and collaboration, there are times when a user does not wish to be bothered or interrupted. This convenience is provided by a "do not disturb" feature in the instant messaging application. The do-not-disturb feature of an instant messaging system is typically enforced from the receivers' client by setting an associated status. Once this status is set it prevents other users from contacting the person until such time as the person returns to an active (or similar) status. However, situations can arise when it is deemed necessary to contact a person who is operating in do-not-disturb status. Conventional instant messaging systems do not provide a do-not-disturb override capability. Therefore, once do-not-disturb status has been activated, the instant messaging user is unreachable by instant message until the user returns to active status.

SUMMARY OF THE DISCLOSURE

In a first implementation, a method includes defining one or more authorized users capable of granting do-not-disturb circumvention privileges. An indicator of a grant of do-not-disturb circumvention privileges to a circumventing user by the one or more authorized users is received. A do-not-disturb status of an instant messaging user is circumvented based upon, at least in part, the grant of do-not-disturb circumvention privileges.

One or more of the following features may be included. Defining the one or more authorized users may include defining the one or more authorized users based upon, at least in part, a hierarchal position of the one or more authorized users. Defining the one or more authorized users may include defining a designated user. The one or more authorized users include a system-wide authorized user.

The grant of do-not-disturb circumvention privileges may be temporary. The grant of do-not-disturb circumvention privileges may be limited to a predefined time period. The grant of do-not-disturb circumvention privileges may be limited to a predefined number of circumventions. The grant of do-not-disturb circumvention privileges may be persistent.

The method may further include associating a grant of do-not-disturb circumvention privileges with the circumventing user. Associating a grant of do-not-disturb circumvention privileges with the circumventing user may include providing the circumventing user with a circumvention certificate.

According to another implementation, a computer readable medium includes a plurality of instructions stored on it. When executed by a processor, the instructions cause the processor to perform operations including defining one or more authorized users capable of granting do-not-disturb circumvention privileges. An indicator of a grant of do-not-disturb circumvention privileges to a circumventing user by the one or more authorized users is received. A do-not-disturb status of an instant messaging user is circumvented based upon, at least in part, the grant of do-not-disturb circumvention privileges.

One or more of the following features may be included. The instructions for defining the one or more authorized users may include instructions for defining the one or more authorized users based upon, at least in part, a hierarchal position of the one or more authorized users. The instructions for defining the one or more authorized users may include instructions for defining a designated user. The one or more authorized users may include a system-wide authorized user.

The grant of do-not-disturb circumvention privileges may be temporary. The grant of do-not-disturb circumvention privileges may be limited to a predefined time period. The grant of do-not-disturb circumvention privileges may be limited to a predefined number of circumventions. The grant of do-not-disturb circumvention privileges is persistent.

Instructions may be included for associating a grant of do-not-disturb circumvention privileges with the circumventing user. The instructions for associating a grant of do-not-disturb circumvention privileges with the circumventing user may include instructions for providing the circumventing user with a circumvention certificate.

The details of one or more implementations are set forth in the accompanying drawings and the description below. Other features and advantages will become apparent from the description, the drawings, and the claims.

DETAILED DESCRIPTION

Figure 1:
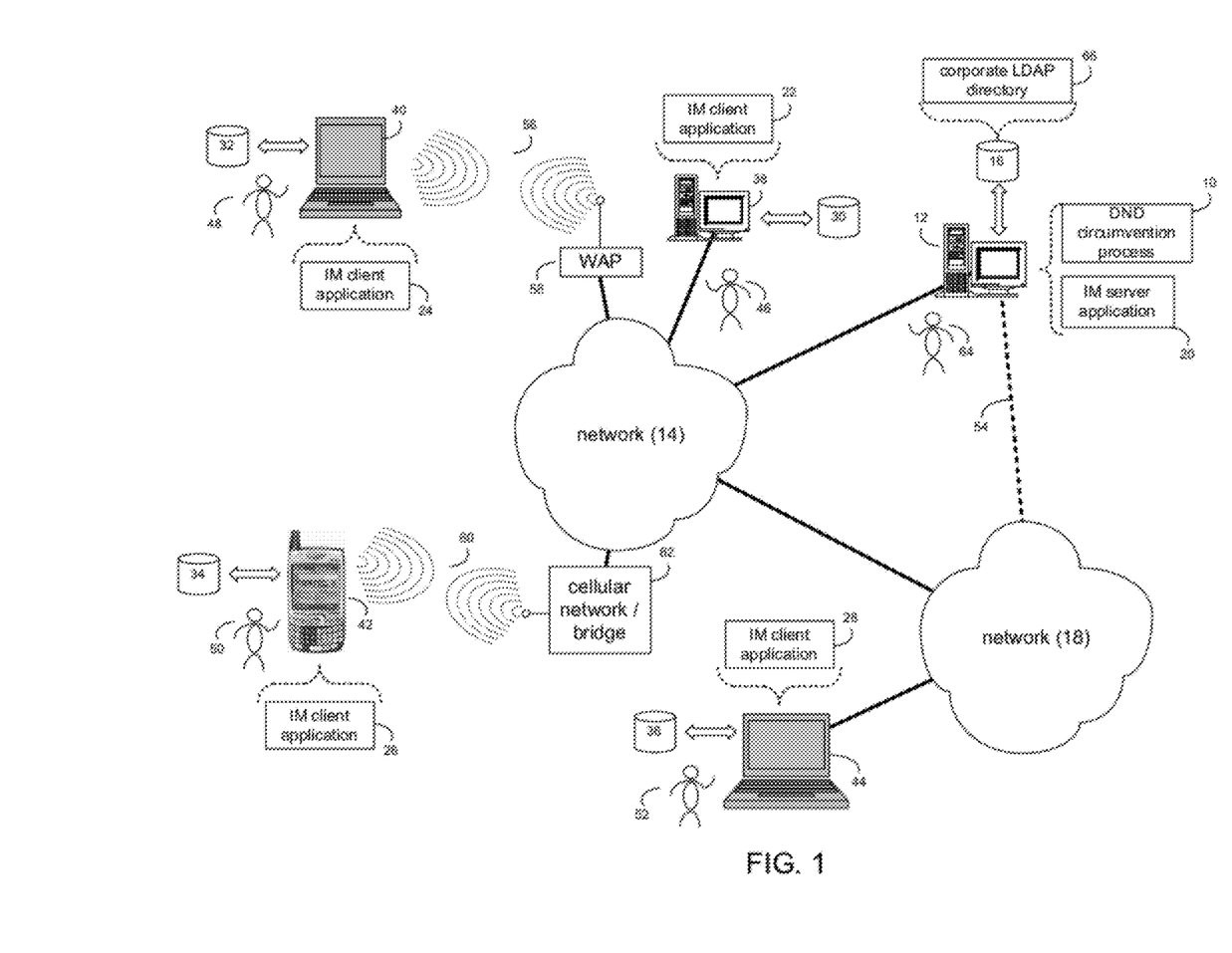
FIG. 1 diagrammatically depicts a DND circumvention process and an instant messaging application coupled to a distributed computing network.

System Overview:

Referring to FIG. 1, there is shown do-not-disturb circumvention process ("DND circumvention process") 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example.

As will be discussed below in greater detail, DND circumvention process 10 may allow one or more authorized users to be defined. The one or more authorized users may be capable of granting do-not-disturb circumvention privileges. An indicator of a grant of do-not-disturb privileges to a circumventing user by the one or more authorized users may be received. A do-not-disturb status of an instant messaging user may be circumvented based upon, at least in part, the grant of do-not-disturb circumvention privileges.

The instruction sets and subroutines of DND circumvention process 10, which may be stored on storage device 16 coupled to server computer 12, may be executed by one or more processors (not shown) and one or more memory architectures (not shown) incorporated into server computer 12. Storage device 16 (i.e., a non-transitory computer readable medium) may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute instant messaging server application 20, examples of which may include, but are not limited to IBM Lotus Sametime™, Microsoft Office Live Communications Server™, Jabber XCP™, and AOL Instant Messenger™. Instant messaging server application 20 may route instant messages to instant messaging client applications, e.g., instant messaging client applications 22, 24, 26, 28, examples of which may include but are not limited to IBM Lotus Sametime™, Microsoft Office Communicator™, Google Talk™, and AOL Instant Messenger™, for example. DND circumvention process 10 may be a stand alone application that interfaces with instant messaging server application 20 or an applet/application that is executed within instant messaging server application 20.

The instruction sets and subroutines of instant messaging server application 20, which may be stored on storage device 16 coupled to server computer 12 may be executed by one or more processors (not shown) and one or more memory architectures (not shown) incorporated into server computer 12.

The instruction sets and subroutines of instant messaging client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 (i.e., non-transitory computer readable media) may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled cellular telephone (not shown), and a dedicated network device (not shown), for example. Using instant messaging client applications 22, 24, 26, 28, users 46, 48, 50, 52 may access instant messaging server application 20 and may recieve, create, and manage instant messages.

Users 46, 48, 50, 52 may access instant messaging server application 20 directly through the device on which the instant messaging client application (e.g., instant messaging client applications 22, 24, 26, 28) is executed, namely client electronic devices 38, 40, 42, 44, for example. Users 46, 48, 50, 52 may access instant messaging server application 20 directly through network 14 or through secondary network 18. Further, server computer 12 (i.e., the computer that executes instant messaging server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

Figure 2:
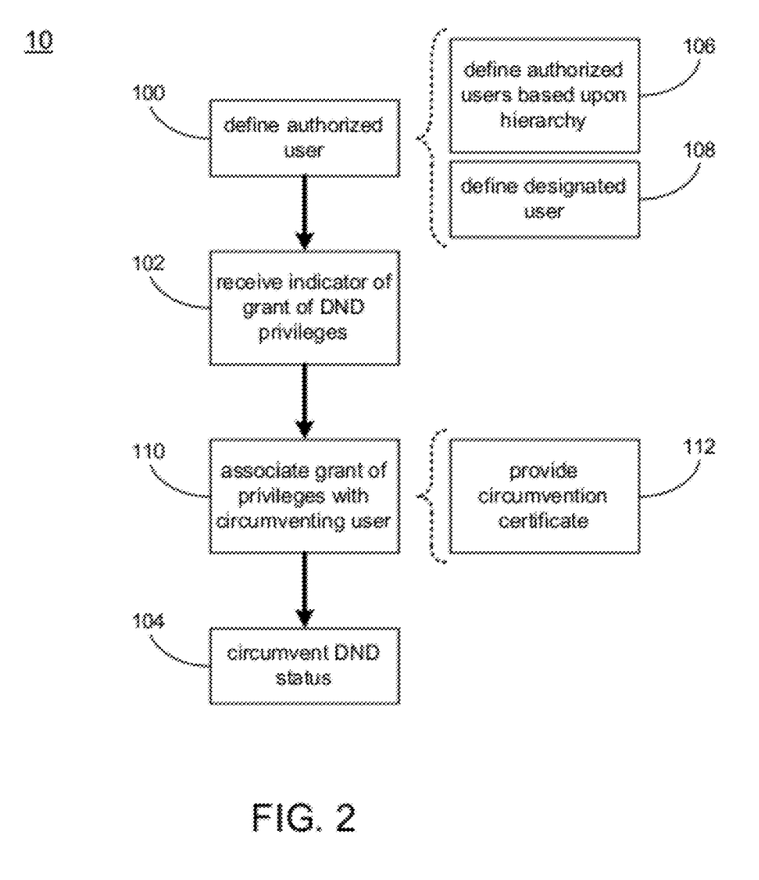
FIG. 2 is a flowchart of a process executed by the DND circumvention process of FIG. 1.

The DND Circumvention Process:

Referring also to FIG. 2, DND circumvention process 10 may allow one or more authorized users to be defined 100. The one or more authorized users may be capable of granting do-not-disturb circumvention privileges. DND circumvention process 10 may receive 102 an indicator of a grant of do-not-disturb circumvention privileges to a circumventing user by the one or more authorized users. A do-not-disturb status of an instant messaging user may be circumvented 104 based upon, at least in part, the grant of do-not-disturb circumvention privileges.

For example, DND circumvention process 10 may allow user 64 to define 100 a one or more authorized users capable of granting do-not-disturb circumvention privileges. User 64 may be, for example, a system administrator, or some other user having authority to define policies for an instant messaging system. DND circumvention process 10 may allow user to decide who should be allowed to circumvent a do-not-disturb status of a instant messaging user, and define 100 the one or more authorized users accordingly.

Defining 100 the one or more authorized users may include defining 106 the one or more authorized users based upon, at least in part, a hierarchal position of the one or more authorized users. For example, in maintaining the applicability of the do-not-disturb status, there may be at least some restrictions upon who may be allowed to circumvent a do-not-disturb status of an instant messaging user. Similarly, there may also be at least some restrictions upon who may be allowed to grant do-not-disturb circumvention privileges to other users. Continuing with the above-stated example, DND circumvention process 10 may allow user 64 to define 106 the one or more users capable of granting do-not-disturb circumvention privileges based upon, at least in part, a hierarchal position of the authorized user relative to the instant messaging user. For example, and referring also to FIG. 3, users 46, 48, 50, 52 may be members of an organization (e.g., a corporation) having hierarchal structure 150. Hierarchal structure 150 may be, for example, implicitly or explicitly defined in a directory, such as corporate LDAP (Lightweight Directory Access Protocol) directory 66, or similar directory. Corporate LDAP directory 66 may reside on storage device 16 couple to server computer 12. User 46 may have a higher relative hierarchal status relative to user 48 and an equal hierarchal status relative to user 50. User 52 may have a higher hierarchal status relative to users 46, 48, 50.

Figure 3:
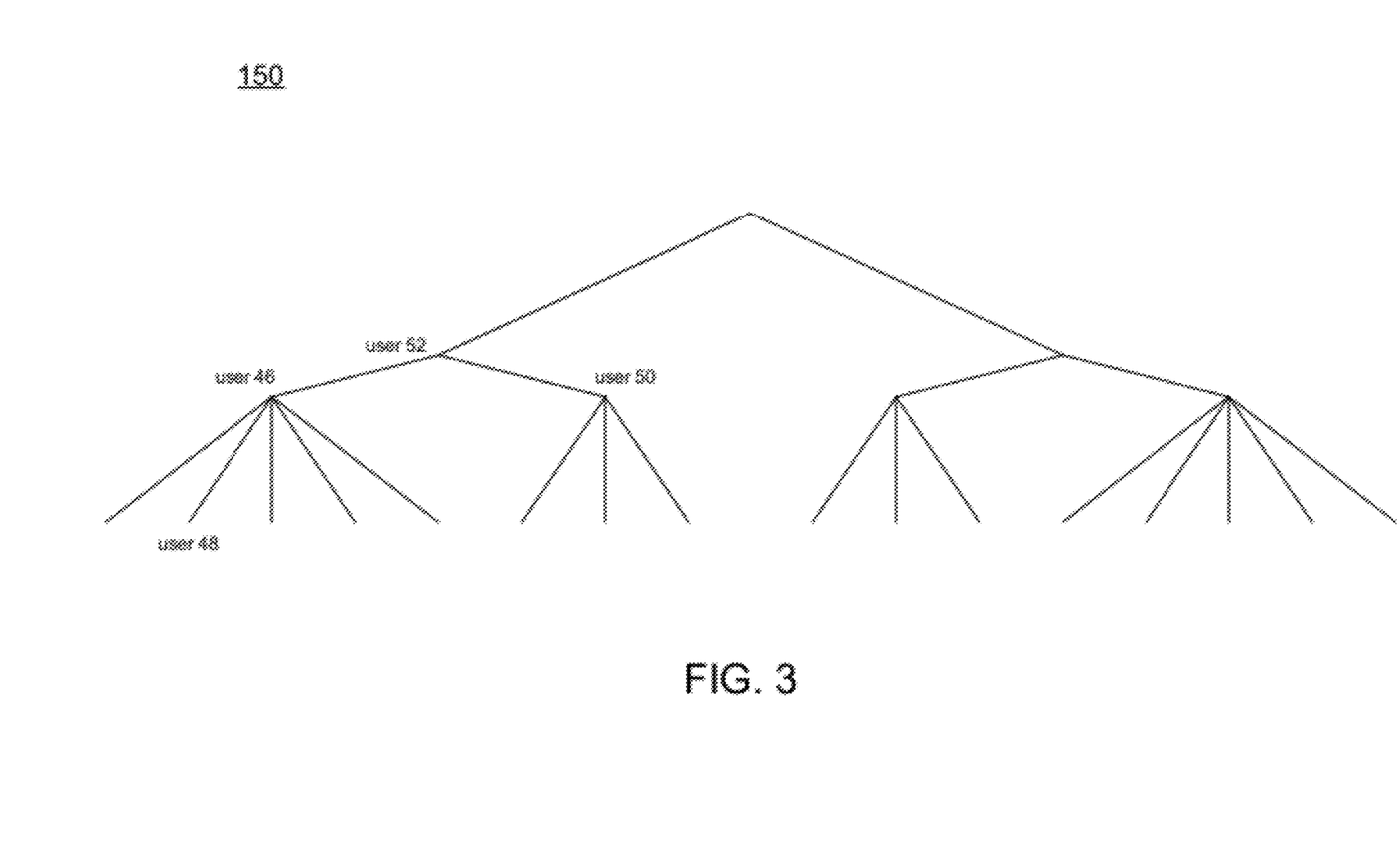
FIG. 3 diagrammatically depicts a hierarchal structure of users having access to the distributed computing network of FIG. 1.

Consistent with the concept that maintaining the applicability of the do-not-disturb status, DND circumvention process 10 may allow user 64 to define 106 one or more authorized users capable of granting do-not-disturb circumvention privileges based upon hierarchal position relative to an instant messaging user. For example, user 64 may define 106 an authorized user as being any user having a distance of hierarchal separation equal to, or greater than, two from the instant messaging user. In such an example, user 46, positioned directly above the user 48 in organizational hierarchy 150 (i.e., having a distance of hierarchal separation of one relative to user 48), may not be defined 100 as an authorized user capable of granting do-not-disturb circumvention privileges relative to user 48. User 52, residing two tiers above user 48 in organizational hierarchy 150 (i.e., having a distance of hierarchal separation of two relative to user 48), may be defined 106 as an authorized user capable of granting do-not-disturb circumvention privileges relative to user 48. Other distances of hierarchal separation may be implemented. Accordingly, the one or more authorized users capable of granting do-not-disturb circumvention privileges may vary depending upon the instant messaging user.

In addition/as an alternative to defining 106 one or more authorized users based on a distance of hierarchal separation from the instant messaging user, defining 106 one or more authorized users based upon, at least in part, hierarchal position of the one or more authorized users may include defining the one or more authorized users based upon, at least in part, the hierarchal position of the authorized users. For example, DND circumvention process 10 may allow user 64 to define 106 the one or more authorized users as being any user who is a manager, department head, seniority, pay grade, or similar defined position, e.g., which may be indicated in corporate LDAP directory 66, for example.

Defining the one or more authorized users may include defining a designated user. For example, DND circumvention process 10 may allow user 64 to define 108 particular individuals who may be designated users for the purpose of granting do-not-disturb circumvention privileges. The designated users may be, for example, supervisors, system administrators (e.g., user 64), or the like that are considered "trusted users". The one or more authorized users may include a system-wide authorized user, who may capable of granting do-not-disturb circumvention privileges relative to any instant messaging user in the instant messaging system. Additionally/alternatively, the one or more authorized users may be restricted, e.g., to only granting do-not-disturb circumvention privileges relative to a specified group of instant messaging users, e.g., instant messaging users in the authorized user's division, etc.

For the following discussion, instant messaging client application 22 is going to be described for illustrative purposes. This should not, however, be construed as a limitation of this disclosure as other instant messaging client applications (e.g., instant messaging client applications 24, 26, 28) may be equally utilized.

Figure 4:
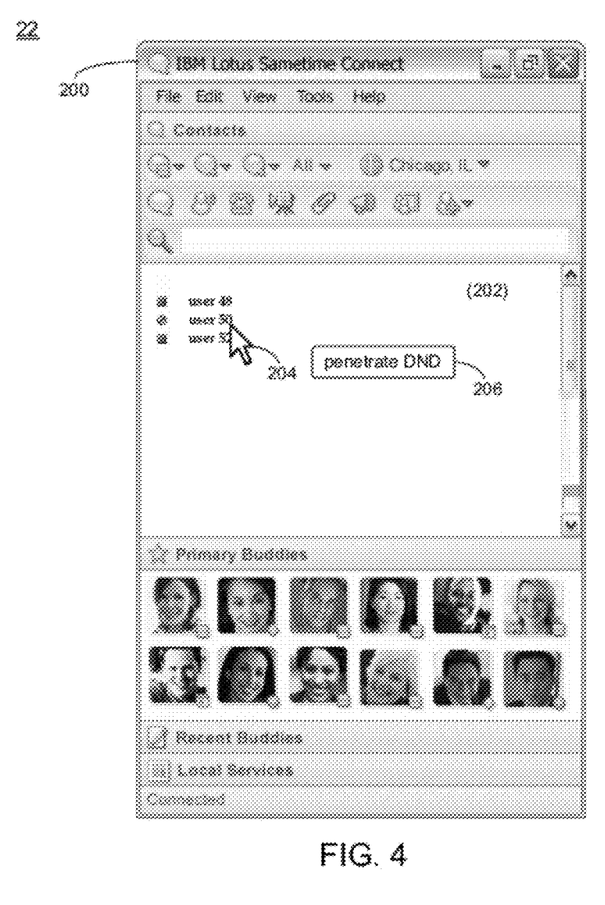
FIG. 4 is a diagrammatic view of an instant messaging visual interface rendered by the DND circumvention process and/or the instant messaging application of FIG. 1.

Continuing with the above-stated example, instant messaging client application 22 (alone or in conjunction with instant messaging server application 20) may allow user 46 to conduct instant messaging chats with other users. Referring also to FIG. 4, instant messaging client application 22 may provide instant messaging visual interface 200, e.g., which may include user list 202. User list 202 may include a listing of instant messaging users currently online. Additionally, user list 202 may indicate a status of the various online users. For example, as shown, user 48 and user 52 may have an active status, e.g., indicating that, in addition to being online, user 48 and user 52 are willing to engage in instant messaging chats. Further, user 50 may have a do-not-disturb status, e.g., indicating that while user 50 is online, user 50 does not wish to be disturbed and is, therefore, not receiving instant messages.

User 46 may request permission to instant message user 50 even though user 50 has entered a do-not-disturb status (e.g., to discuss an important matter). For example, user 46 may select, via onscreen pointer 204 (which may be controlled by a pointing device, such as a mouse; not shown) user 50 in user list 202. Once user 50 is selected in user list 50, user 46 may right-click the pointing device controlling onscreen pointer 204, resulting in instant messaging client application 22 (alone or in conjunction with one or more of instant messaging server application 20 and/or DND circumvention process 10) rendering pop-up menu 206. While pop-up menu 206 is shown to only include a single option, namely "penetrate DND", this is merely for illustrative purposes and is not intended as a limitation of this disclosure, as the number and nature of the options included within pop-up menu 206 may vary according to user preference and design criteria.

Figure 5:
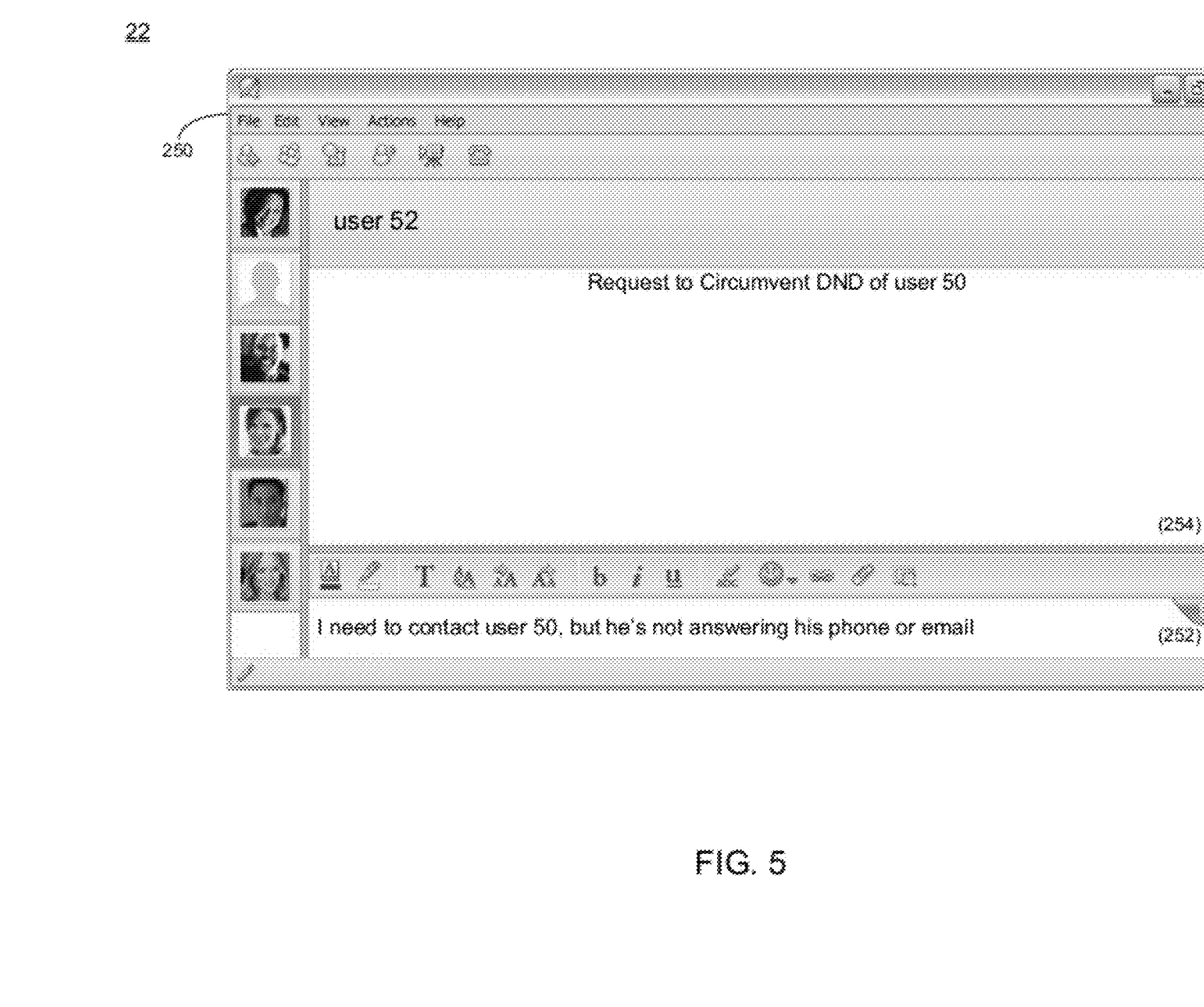
FIG. 5 is a diagrammatic view an instant messaging chat window rendered by the DND circumvention process and/or the instant messaging application of FIG. 1.

Selecting "penetrate DND" from pop-up menu 206 may result in instant messaging client application 22, instant messaging server application 20, and/or DND circumvention process 10 sending, to one or more defined 100 authorized users (e.g., user 52), a request for user 46 to be able to circumvent the do-not-disturb status of user 50. For example, and referring also to FIG. 5, selecting "penetrate DND" from pop-up menu 206 may result in instant messaging client application rendering instant messaging chat window 250. Chat window 250 may allow user 46 to request do-not-disturb circumvention privileges from an authorized user (e.g., user 52). For example, user 46 may input, e.g., using a keyboard (not shown), the reason for requesting circumvention of user 50's do-not-disturb status in typing pane 252 of chat window 250. When user 46 presses enter on the keyboard, after typing the desired message, instant messaging client application 22, instant messaging server application 20, and/or DND circumvention process 10 may send the request to user 52 (i.e., an authorized user).

Figure 6:
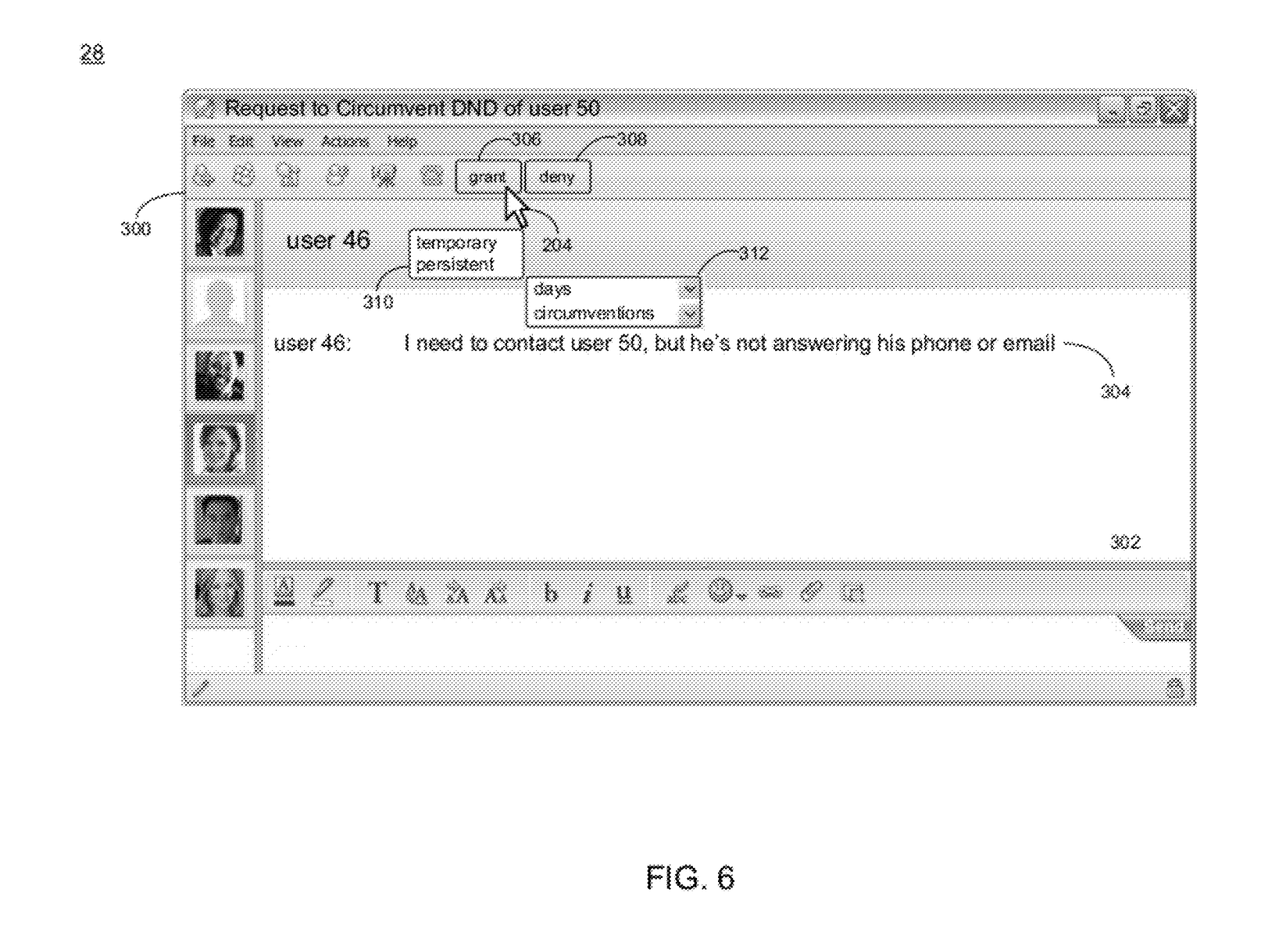
FIG. 6 is a diagrammatic view of an instant messaging chat window rendered by the DND circumvention process and/or the instant messaging application of FIG. 1.

Continuing with the above-stated example, user 52 may receive the do-not-disturb circumvention request from user 46 as an instant message. Referring also to FIG. 6, instant messaging client application 28 (alone or in conjunction with one or more of instant messaging server application 20 and/or DND circumvention process 10) may render chat window 300. The request from user 46 to circumvent user 50's do-not-disturb status (i.e., "I need to contact user 50, but he's not answering his phone or email") may be included in chat pane 302 as an instant message 304. As an authorized user capable of granting do-not-disturb circumvention privileges, user 52 may decide to allow, or not allow, user 46 to circumvent user 50's do-not-disturb status. User 52 may grant or deny user 46's request to penetrate user 50's do-not-disturb status by selecting, via onscreen pointer 204, one of "grant" button 306 or "deny" button 308, included in chat window 300.

The grant of do-not-disturb circumvention privileges may be temporary or persistent. Continuing with the above-stated example, selecting "grant" button 306 may result in instant messaging client application 28 and/or DND circumvention process 10 rendering pop-up menu 310 including the options "temporary" and "persistent". While pop-up menu is shown including two options, namely "temporary" and "persistent" this is merely for illustrative purposes, as the number and nature of the options included within pop-up menu 310 may vary according to user preference and design criteria. User 52 may select one of the options (e.g., "temporary" or "persistent") from within pop-up menu 310 to define the characteristics of the grant of do-not-disturb circumvention privileges being granted to user 46.

For example, the grant of do-not-disturb circumvention privileges may be limited to a predefined time period or to a predefined number of circumventions. Continuing with the above-stated example, selecting the option "temporary" from within pop-up menu 310 may result in instant messaging client application 28 and/or DND circumvention process 10 rendering pop-up menu 312. While pop-up menu 312 is only shown including two options, namely "days" and "circumventions", this is intended for the purpose of illustration only and should not be construed as a limitation on this disclosure as the number and nature of the options included within pop-up menu 312 may vary according to user preference and design criteria. The options "days" and "circumventions" may include associated pull downs allowing user 52 to select, via onscreen pointer 204, the duration of the grant of circumvention privileges, either in terms of the number of days or in terms of the number of time user 46 may circumvent the do-not-disturb status of user 50. Various additional/alternative constraints on the grant of do-not-disturb circumvention privileges may be equally utilized depending upon user preference and design criteria.

In addition to making the grant of do-not-disturb circumvention privileges temporary, user 52 may choose to make the grant of do-not-disturb circumvention privileges persistent. For example, user 52 may select, via onscreen pointer 204, the option "persistent" from pop-up menu 310. Selecting the option "persistent" may grant perpetual do-not-disturb circumvention privileges to user 46 for circumventing a do-not-disturb status of user 50.

Selecting "grant" button 306 (as well as any additional options, such as temporary or persistent, that may be available) may result in DND circumvention process 10 receiving 102 an indicator of a grant of do-not-disturb circumvention privileges to a circumventing user (e.g., user 46) by the authorized user (e.g., user 52). Based upon, at least in part, receiving 102 the indicator of a grant of do-not-disturb circumvention privileges to user 46, DND circumvention process 10 may associate 110 a grant of circumvention privileges with user 46 for circumventing user 50's do-not-disturb status. Associating 110 a grant of do-not-disturb circumvention privileges with the circumventing user (e.g., user 46) may include providing 112 the circumventing user with a circumvention certificate. The circumvention certificate may include, but is not limited to, a token, a certificate, or credential, for example.

Figure 7:
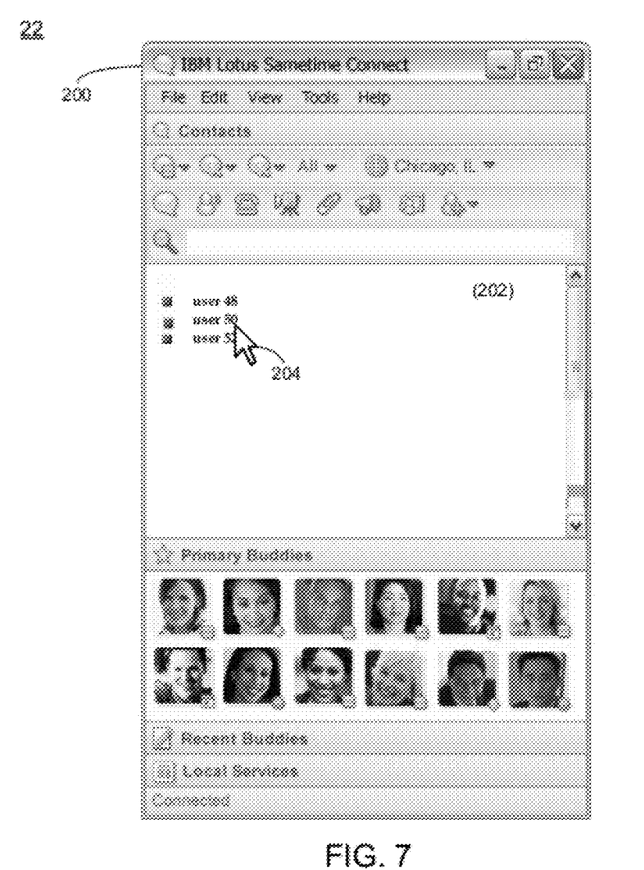
FIG. 7 is a diagrammatic view of an instant messaging visual interface rendered by the DND circumvention process and/or the instant messaging application of FIG. 1.

Based upon, at least in part, the grant of do-not-disturb privileges associated 110 with user 46, DND circumvention process 10 may allow user 46 to circumvent 104 the do-not-disturb status of an instant messaging user (e.g., user 50). For example, and referring also to FIG. 7, instant messaging client application may render instant messaging visual interface 200, e.g., which may include user list 202. DND circumvention process 10 may allow user 46 to circumvent the do-not-disturb status of user 50, e.g., as reflected by user 50's available status in user list 202.

A number of implementations have been described. Nevertheless, it will be understood that various modifications may be made. Accordingly, other implementations are within the scope of the following claims.

What is claimed is:

1. A method comprising:
   receiving, by an instant messaging client associated with an instant messaging user, permissions designating the instant messaging user an authorized instant messaging user of one or more authorized users capable of granting do-not-disturb circumvention privileges;
   receiving, by the instant messaging client, a request from a second instant messaging user to circumvent a do-not-disturb status of a third instant messaging user;
   associating a grant of do-not-disturb circumvention privileges with the second instant messaging user;
   transmitting, by the instant messaging client, an indicator of the grant of do-not-disturb circumvention privileges to the second instant messaging user; and
   circumventing the do-not-disturb status of the third instant messaging user based upon, at least in part, the grant of do-not-disturb circumvention privileges to the second instant messaging user.

2. The method of claim 1, wherein the one or more authorized users are defined based upon, at least in part, a hierarchal position of the one or more authorized users.

3. The method of claim 1, wherein the one or more authorized users includes a designated user.

4. The method of claim 1, wherein the one or more authorized users include a system-wide authorized user.

5. The method of claim 1, wherein the grant of do-not-disturb circumvention privileges is temporary.

6. The method of claim 5, wherein the grant of do-not-disturb circumvention privileges is at least one of: limited to a predefined time period, and persistent.

7. The method of claim 5, wherein the grant of do-not-disturb circumvention privileges is limited to a predefined number of circumventions.

8. The method of claim 1, further including associating a grant of do-not-disturb circumvention privileges with the second instant messaging user.

9. The method of claim 8, wherein associating a grant of do-not-disturb circumvention privileges with the second instant messaging user includes providing the second instant messaging user with a circumvention certificate.

10. The method of claim 1, further comprising displaying an indication of the grant of do-not-disturb circumvention privileges is displayed to the second instant messaging user in an instant messaging visual interface, wherein the indication is displayed as a status corresponding to the third instant messaging user in a user list of the instant messaging visual interface.

11. A computer program product residing on a non-transitory computer readable medium having a plurality of instructions stored thereon which, when executed by a processor, cause the processor to perform operations comprising:
   receiving, by an instant messaging client associated with an instant messaging user, permissions designating the instant messaging user an authorized instant messaging user of one or more authorized users capable of granting do-not-disturb circumvention privileges;
   receiving, by the instant messaging client, a request from a second instant messaging user to circumvent a do-not-disturb status of a third instant messaging user;
   associating a grant of do-not-disturb circumvention privileges with the second instant messaging user;
   transmitting, by the instant messaging client, an indicator of the grant of do-not-disturb circumvention privileges to the second instant messaging user; and
   circumventing the do-not-disturb status of the third instant messaging user based upon, at least in part, the grant of do-not-disturb circumvention privileges to the second instant messaging user.

12. The computer program product of claim 11, wherein the one or more authorized users are defined based upon, at least in part, a hierarchal position of the one or more authorized users.

13. The computer program product of claim 11, wherein the one or more authorized users include a designated user.

14. The computer program product of claim 11, wherein the one or more authorized users include a system-wide authorized user.

15. The computer program product of claim 11, wherein the grant of do-not-disturb circumvention privileges is temporary.

16. The computer program product of claim 15, wherein the grant of do-not-disturb circumvention privileges is at least one of: limited to a predefined time period, and persistent.

17. The computer program product of claim 15, wherein the grant of do-not-disturb circumvention privileges is limited to a predefined number of circumventions.

18. The computer program product of claim 11, further including instructions for associating a grant of do-not-disturb circumvention privileges with the second instant messaging user.

19. The computer program product of claim 18, wherein the instructions for associating a grant of do-not-disturb circumvention privileges with the second instant messaging user include instructions for providing the second instant messaging user with a circumvention certificate.

20. The computer program product of claim 11, further including instructions for displaying an indication of the grant of do-not-disturb circumvention privileges is displayed to the second instant messaging user in an instant messaging visual interface, wherein the indication is displayed as a status corresponding to the third instant messaging user in a user list of the instant messaging visual interface.

* * * * *